US007201259B2

(12) United States Patent
Knaust

(10) Patent No.: US 7,201,259 B2
(45) Date of Patent: Apr. 10, 2007

(54) ADJUSTABLE-LENGTH COMPRESSION SPRING

(75) Inventor: Holger Knaust, Kummersbruck (DE)

(73) Assignee: Suspa Holding GmbH, Altdorf (DE)

( * ) Notice: Subject to any disclaimer, the term of this patent is extended or adjusted under 35 U.S.C. 154(b) by 161 days.

(21) Appl. No.: 10/989,619

(22) Filed: Nov. 17, 2004

(65) Prior Publication Data

US 2005/0103586 A1     May 19, 2005

(30) Foreign Application Priority Data

Nov. 18, 2003   (DE)  ............................... 103 53 903

(51) Int. Cl.
*F16F 9/32*     (2006.01)
(52) U.S. Cl. .................... 188/300; 267/64.12
(58) Field of Classification Search ................ 188/300; 267/64.12; 248/406.1
See application file for complete search history.

(56) References Cited

U.S. PATENT DOCUMENTS

| | | | | |
|---|---|---|---|---|
| 2,774,336 A | * | 12/1956 | Geyer | ........................... 91/44 |
| 2,801,615 A | * | 8/1957 | Geyer | ...................... 91/417 R |
| 3,559,776 A | * | 2/1971 | Schultze | ..................... 188/300 |
| 4,458,887 A | | 7/1984 | Shimokura et al. | |
| 4,580,365 A | * | 4/1986 | Sieg | ............................. 49/336 |
| 4,633,686 A | * | 1/1987 | Carr | ............................ 70/179 |
| 4,728,072 A | * | 3/1988 | Mitchell | ................. 248/406.1 |
| 5,921,359 A | * | 7/1999 | Holle | .......................... 188/300 |
| 6,178,870 B1 | * | 1/2001 | Takahashi | ...................... 92/17 |

FOREIGN PATENT DOCUMENTS

| | | |
|---|---|---|
| DE | 2345503 | 3/1975 |
| DE | 3602441 A1 | 7/1987 |
| DE | 8660017.6 | 7/1987 |
| DE | 3826862 C2 | 2/1990 |
| DE | 4235435 A1 | 4/1994 |
| DE | 29905265 U1 | 8/1999 |
| DE | 69607655 T2 | 11/2000 |
| EP | 0052832 A2 | 6/1982 |

* cited by examiner

*Primary Examiner*—Christopher P. Schwartz
(74) *Attorney, Agent, or Firm*—Browdy and Neimark, PLLC

(57) ABSTRACT

An adjustable-length compression spring comprises a casing filled with pressure fluid. A piston rod is sealingly extended through a guide and seal unit which closes the casing, a piston, which is sealingly guided therein, being joined to the piston rod. The piston divides the casing into two sectional casing chambers, which are filled with pressure fluid. For connection to each other of the sectional casing chambers, provision is made for a valve operated by a valve pin. The casing includes a locking mechanism which comprises a first and a second locking element, the first of which being in pushing connection with a first operating element and the second with the valve pin. They cooperate in the way of a retractable-ballpoint-pen mechanism so that, in a first position of locking, the valve pin takes a position of release with free connection between the sectional casing chambers and, in a second position of locking, it takes a position of blocking with any connection between the sectional casing chambers being shut off. This type of integrated locking mechanism can be made solid, nevertheless needing little space.

7 Claims, 5 Drawing Sheets

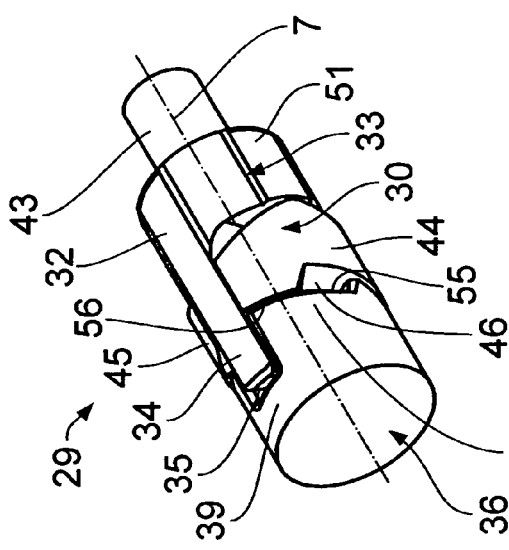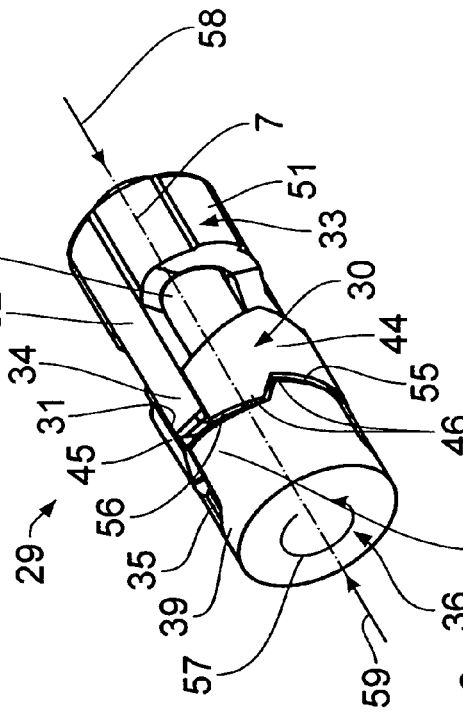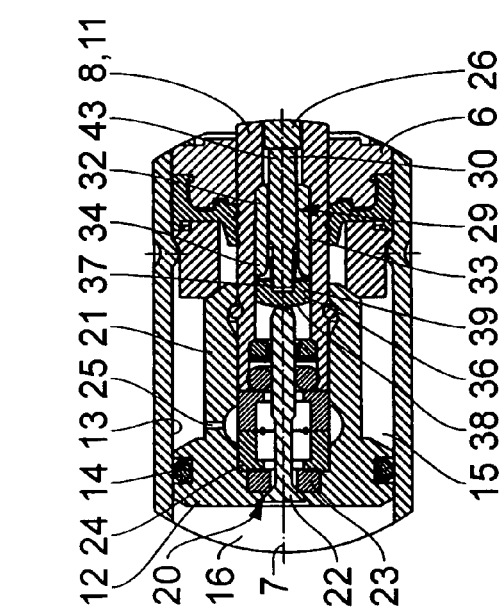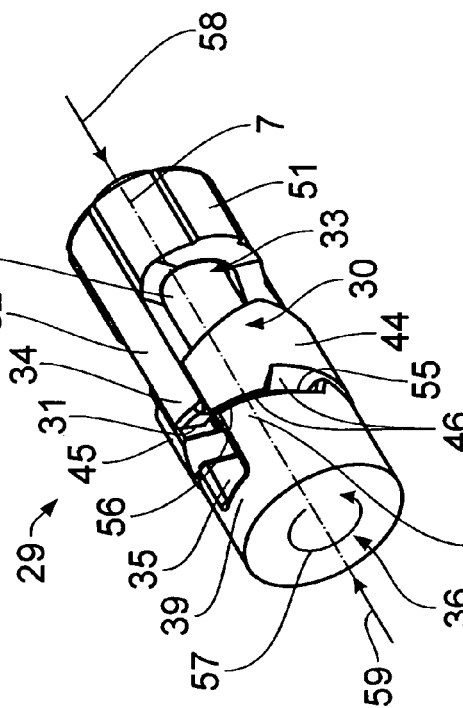
Fig. 6
Fig. 7
Fig. 8
Fig. 9

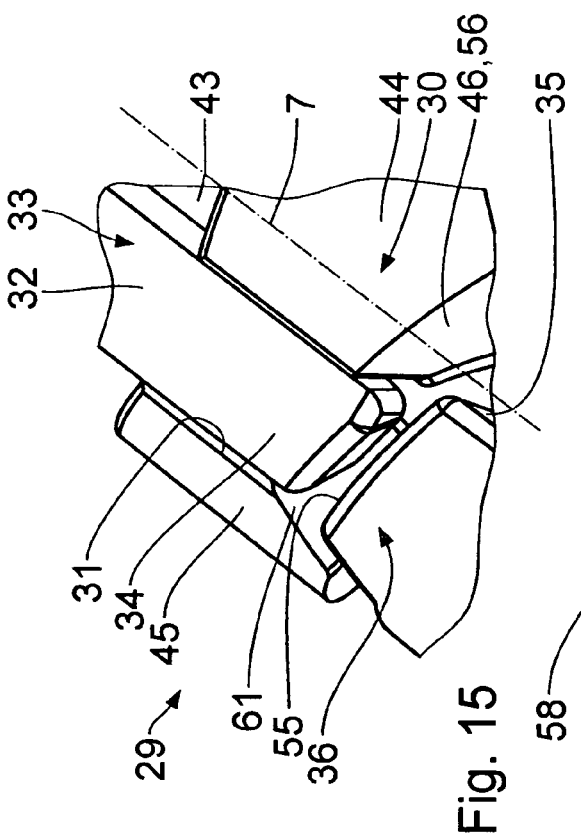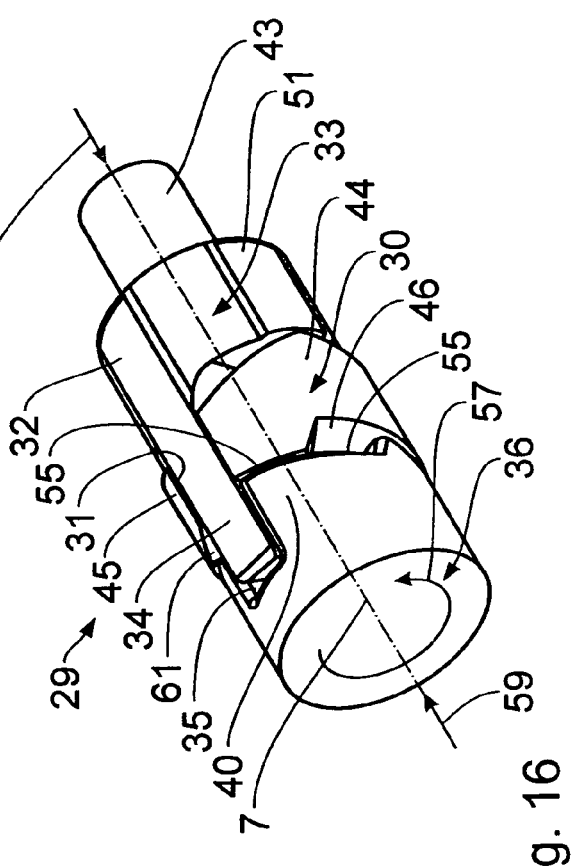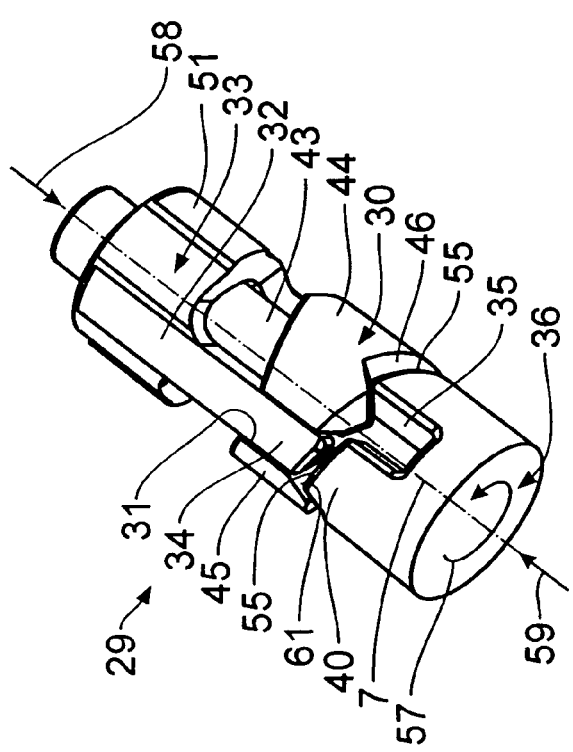

ADJUSTABLE-LENGTH COMPRESSION SPRING

BACKGROUND OF THE INVENTION

1. Field of the Invention

The invention relates to an adjustable-length compression spring having a casing filled with pressure fluid; a guide and seal unit which closes the casing at a first end; a piston rod which, through the guide and seal unit, is extended from, and sealed towards, the first end and has an outer end; a piston which is joined to the piston rod and sealingly guided in the casing; a first sectional casing chamber which is unilaterally defined by the piston and filled with pressure fluid; a second sectional casing chamber which is connectable to the first sectional casing chamber and filled with pressure fluid; an operating valve for connection to each other of the sectional casing chambers, the valve comprising a valve pin to be actuated from outside the casing by an operating element, the valve pin being displaceable between a position of release and a position of blocking such that in the position of release of the valve pin, the connection between the sectional casing chambers is released; and in the position of blocking of the valve pin, the connection between the sectional casing chambers is shut off.

2. Background Art

Compression springs of the generic type are known from DE 36 02 441 A1, DE 42 35 435 A1 as well as from prior public use, having a field of application for instance in office chair, in which case they are used for height adjustment of seats as well as inclination adjustment of seating areas and backrests for example in known synchronous mechanisms. This is intended to create the possibility of permanently keeping the compression spring in a position of release, providing for example for seesaw motion of the synchronous mechanism. Quite a few solutions have been suggested for durably keeping the compression spring in a position of release, among which figure lockable lever mechanisms of comparatively complicated structure. EP 0 052 832 A2 describes a locking-button release of a gas spring included in a control head that will be screwed on to the free end of the piston rod of the gas spring. Although this control-head type solution has been available for more than twenty years, it has never proved successful apparently due to constructional problems posed in particular by adaptation of the control head to a respective gas spring and the dimensional requirements involved.

SUMMARY OF THE INVENTION

It is an object of the invention to develop a possibility of arresting a compression spring of the type mentioned at the outset in a position of release, by which to overcome the problems posed by known solutions.

According to the invention, this object is attained in a compression spring that comprises a locking mechanism which is disposed in the casing inside the piston rod, having a first locking element which is in pushing connection with the operating element; a second locking element which is in pushing connection with the valve pin; both of which cooperate in the way of a retractable ballpoint pen mechanism such that the valve pin, in a first position of locking of the locking elements, is in a position of release; and in a second position of locking of the locking elements, is in a position of blocking.

The gist of the invention resides in integrating the locking mechanism into the piston rod of the compression spring within the casing. As a result, the compression spring cooperates with the locking mechanism that serves for implementation of arrest, forming a compact constructional unit. The dimensional requirements of this unit are inferior to those of a compression spring with a control head screwed on. Moreover, the locking elements of the mechanism are excellently protected inside the casing of the compression spring so that they can be made comparatively small. Faulty assembly conditioned by erroneous allocation of a control head to the compression spring, and thus faulty adaptation of the lift of stroke of the locking mechanism in relation to the release lift of stroke of the compression spring are avoided just as well. The locking mechanism according to the invention is able to provide for sufficient lift of stroke so that it may be used even in compression springs that have a comparatively important stroke of release.

A locking mechanism can be manufactured for solidity at a low cost when it is characterized by a snap-in guide element, stationary in the casing, for guidance of a first of the locking elements in the direction of displacement of the valve pin, the locking elements cooperating with the snap-in guide element such that change-over between the two locking positions is obtained by rotation, regularly in the same sense of rotation, of the second locking element, which is not longitudinally guided by the snap-in guide element, in relation to the first locking element, which is longitudinally guided; and such that the locking positions are obtained by locking cooperation of the second locking element with the snap-in guide element. Similar locking mechanisms having made a good account of themselves in retractable-ballpoint-pen mechanisms.

A locking mechanism, in which change-over is obtained by rotation of the second locking element by 180°, can be embodied for solidity, provision being made for comparatively large locking areas. With change-over taking place upon rotation by 180° (a so-called two-stroke system) instead of rotation by 360°, sufficient lift of stroke of the locking mechanism can be implemented. A locking mechanism in which change-over is attained by rotation of the second locking element by 360° is even more solid, but as a rule it has an inferior locking lift of stroke. Locking mechanisms with changeover being attained by rotation of the second locking element by angles of less than 180°, for example rotations by 120° (a so-called three-stroke system) or 90° (a so-called four-stroke system) offer the possibility of important locking strokes, but frequently are of highly filigree design. Fundamentally, the invention can use locking mechanisms of any number of strokes.

A locking element will lead to an especially well integrated locking mechanism when it is integrally joined to a valve-operating rod, by way of which the operating element cooperates with the valve pin via the locking mechanism.

In keeping with a preferred embodiment, the longitudinally guided locking element has inclined delivery wall sections, along which the second locking element slides upon displacement from the position of release into the position of blocking and from the position of blocking into the position of release, one and the same delivery wall section of the longitudinally guided locking element being used for displacement from the position of release into the position of blocking as well as for displacement from the position of blocking into the position of release. With a certain section of a wall of delivery of the longitudinally guided locking element having several jobs upon change-over of the locking mechanism, the longitudinally guided locking element can be embodied for greater solidity in the vicinity of the delivery-wall sections as compared to alternatives in which several wall sections fulfil the jobs of delivery from the position of release into the position of blocking on the one hand and from the position of blocking into the position of release on the other.

With the longitudinally guided locking element comprising an intermediate stop for defined motion of rotation of the second locking element such that, prior to the second locking element cooperating with the snap-in guide element for locking engagement, the longitudinally guided locking element disengages from catching recess of the second locking element, by way of which the second locking element cooperates with the snap-in guide element for locking engagement, this will help prevent the locking mechanism from getting stuck.

This task is still improved by an intermediate stop area being inclined such that the motion of rotation of the second locking element supports a motion of displacement of the longitudinally guided locking element for disengagement thereof from the catching recess of the second locking element.

Details of the invention will become apparent from the ensuing description of an exemplary embodiment of the invention, taken in conjunction with the drawing.

BRIEF DESCRIPTION OF THE DRAWING

FIGS. 2 to 6 are instantaneous views of details of the compression spring according to FIG. 1 with various instantaneous positions of a locking mechanism upon change-over between a position of blocking of the compression spring (FIGS. 2, 6) and a position of release (FIG. 4); and FIGS. 7 to 16 are additional, perspective, instantaneous views of the locking mechanism upon change-over between a position of blocking (FIGS. 7 and 16) and a position of release (FIG. 11), with FIG. 15 being an illustration, on an enlarged scale, of details of FIG. 14.

DESCRIPTION OF A PREFERRED EMBODIMENT

Figure 1:
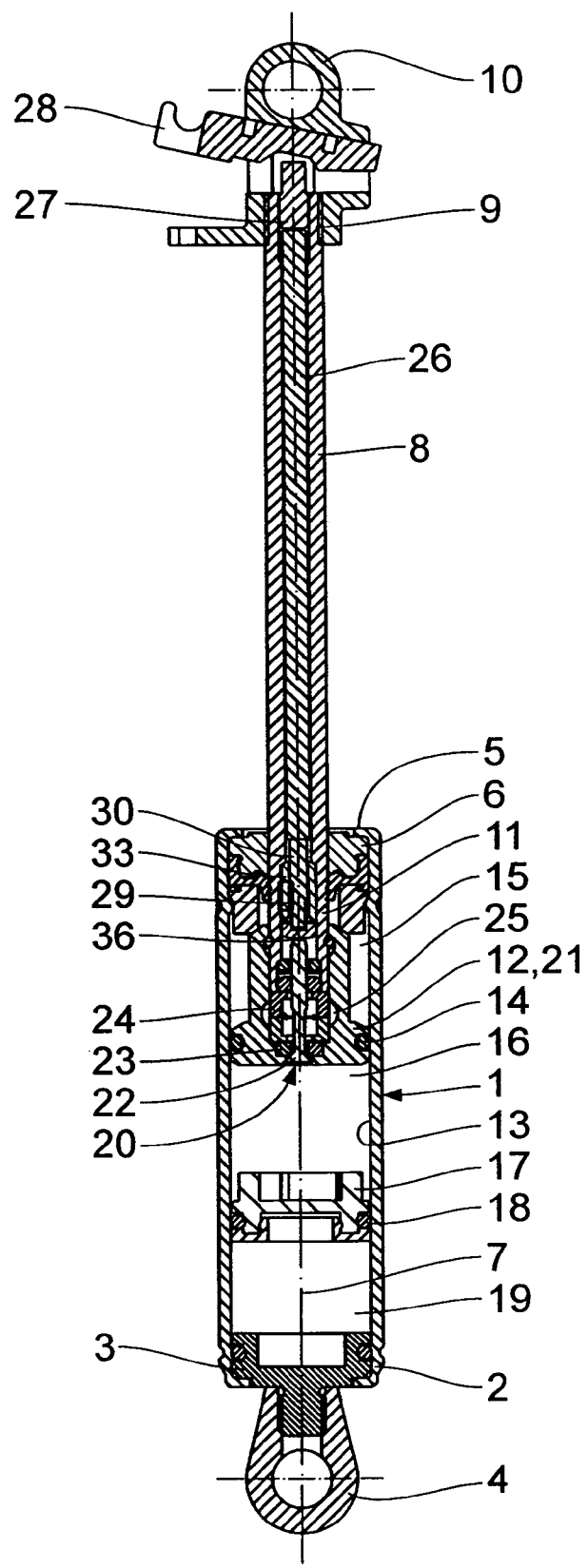
FIG. 1 is a longitudinal sectional view of a compression spring.

The blockable, adjustable-length compression gas spring seen in FIG. 1 includes a substantially cylindrical casing 1 made from a tube, one end 2 of which is closed gas-tightly by a bottom 3 which a fastening element 4 is attached to. The other end 5 of the casing 1 is provided with an annular guide and seal unit 6 for liquid sealing, the unit 6 serving to guide and seal a piston rod 8 that is displaceable in the casing 1 concentrically of the central longitudinal axis 7 thereof. The free end 9, outside the casing 1, of the piston rod 8 is likewise provided with a fastening element 10.

The end 11, inside the casing 1, of the piston rod 8 is provided with a piston 12 which is guided on an inside wall 13 of the casing 1 and liquid-sealed towards the casing 1 by a seal 14. The piston 12 divides the inside of the casing 1 into a first sectional casing chamber 15 between the piston 12 and the guide and seal unit 6 and a second sectional casing chamber 16 that faces away from the chamber 15. The second sectional casing chamber 16 is again defined by a sliding piston 17 which slides on the inside wall 13 of the casing 1 and is liquid-sealed towards it by a seal 18. A compressed gas chamber 19 is disposed between the sliding piston 17 and the bottom 3, holding gas under pressure and serving as an energy storing device. The 5 sectional casing chambers 15, 16 are filled with fluid, for instance hydraulic oil.

The piston 12 includes a blocking valve 20 by means of which to unite, or separate from each other, the sectional casing chambers 15, 16. The valve 10 20 includes a valve gate 21 that is located on the side of the piston 12 turned towards the guide and seal unit 6.

Figure 2:
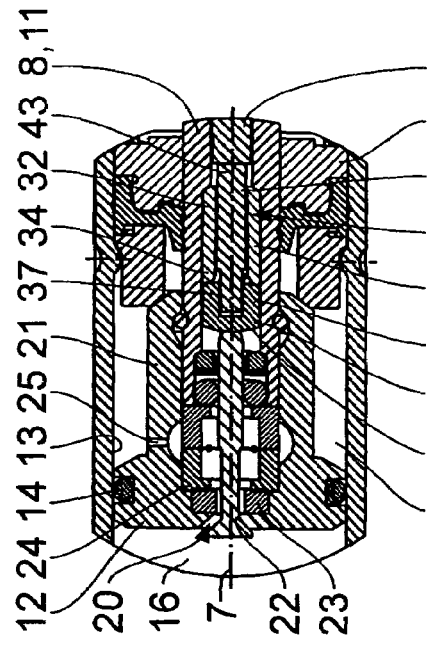

As seen in FIGS. 1, 2 and 6, in the position of blocking of the valve 20, a valve pin 22 acts for sealing towards the valve gate 21 by way of a ring seal 23. Any longitudinal displacement of the piston rod 8 in the casing 1 is precluded in the position of blocking. The valve pin 22 is disposed inside the valve gate 21 coaxially of the longitudinal axis 7. As seen in FIG. 1 above the ring seal 23, the valve pin 22 passes through a multi-piece over-flow gate 24, the interior of which being in flow connection with the first 20 sectional casing chamber 15 by way of an overflow channel 25 that has several side-cuts and ring channels.

Via a locking mechanism designated by 29 in its entirety, the valve pin 22 is in pushing connection with a valve-operating rod 26 which passes 25 through the piston rod 8 and the free end, projecting therefrom, of which having the form of an operating button 27 which can be actuated by a pivoted lever 28. The entire locking mechanism 29 is disposed inside the piston rod 8.

The locking mechanism 29 comprises a first locking element 30 which bears directly against the valve-operating rod 26 so that the first locking element 30 is in pushing connection with the operating button 27. Seen in the cutting plane of FIGS. 2 to 6, the first locking element 30 is a pin prolonging the valve-operating rod 26 towards the valve pin 22. Any further three-dimensional design of the first locking element 30 will become apparent from the ensuing description of FIGS. 7 to 16. The first locking element 30 comprises two guiding grooves 31 (cf. FIG. 8) which cooperate with complementary cams 32, extending along the longitudinal axis 7, of a snap-in guide element 33 that is stationarily fitted into the inside wall of the hollow piston rod 8. The snap-in guide element 33 serves for guidance of a motion of displacement of the first locking element 30 along the axis 7.

On the front wall turned towards the piston 12, the cams 32 of the snap-in guide element 33 each include a locking projection 34 with a skewed face. In the position of blocking of FIGS. 1, 2, and 6, the locking projection 34 of the snap-in guide element 33 is snap-engaged with a catching recess 35 of the second locking element 36. The second locking element 36 has a blind hole 37 which is open towards the first locking element 30 and into which reaches the pin, turned towards the second locking element 36, of the first locking element 30. In the direction towards the valve pin 22, the blind hole 37 is closed by a bottom 38. The blind hole 37 is laterally defined by a sleeve which will be described in detail below; the sleeve is integrally molded on the bottom 38, with the catching recess 35 being formed on the frontal wall thereof opposite the bottom 38.

In the circumferential direction of the axis 7, the sleeve of the second locking element 36 is divided into four sleeve portions, the locking recesses 35 with short sleeve portions 39 on the one hand and two sleeve portions 40 that are prolonged along the axis 7 as compared thereto on the other hand being opposite each other. On the whole, the first locking element 30, the snap-in guide element 33 and the second locking element 36 are dually rotationally symmetrical as related to the axis 7, i.e. the two halves of these elements pass into one another by rotation about the axis 7 by 180°. In the position of blocking, the locking projection 34 snap-engages with the locking recess 35 in such a way that the short sleeve portion 39 are visible in the sectional view of FIGS. 1, 2 and 6.

The valve pin 22 directly adjoins the bottom 38 on the side turned away from the first locking element so that the valve pin 22, upon actuation of the valve-operating rod 26 by the operating button 27, is in pushing connection with the bottom 38 of the second locking element 36.

FIGS. 7 to 16 are perspective views of the locking mechanism 29. The first locking element 30 rests on the valve-operating rod 26 by way of the free front wall of a guide pin 43. The end, turned away from the valve-operating rod 26, of the locking element 30 is designed as a control head with two halves 44, 45. With the locking mechanism 29 assembled, the outer surface areas of the control-head halves 44 rest on the inside wall of the hollow piston rod 8 by clamping engagement and are guided thereby. On their front wall that faces away from the guide pin 43, the control-head halves 44, 45 have locking teeth 46. Provided between the control-head halves 44, 45 are the guiding grooves 31 which oppose the two of them, FIGS. 7 to 16 only showing the guiding groove 31 that is turned towards a viewer. The guiding grooves 31 cooperate with complementary cams 32 of the stationary snap-in guide element 33 in the form of a snap-in guide sleeve. A sleeve 51 constitutes a part of the snap-in guide sleeve 33, prolonging the cams 32 in the direction towards the valve-operating rod 26. The guide pin 43 of the first locking element 30 is guided in the sleeve 51.

In the position of blocking of the locking mechanism 29 seen in FIGS. 7 and 16, the free locking projections 34, turned towards the valve pin 22, of the cams 32 engage with the complementary blind catching recesses 35 of the second locking element 36 of the locking mechanism 29. The outside diameters of the second locking element 36, the control-head halves 44, 45 and the sleeve 51 are approximately equal so that all the three elements are fitted and guided in the piston rod 8. The front wall, turned towards the locking teeth 46, of the second locking element 36 is designed in the form of partially complementary locking teeth 55. In the position of blocking of the locking mechanism 29, the locking teeth 46 of the first locking element 30 rest on the locking teeth 55 of the second locking element 36 by way of two opposed and inclined delivery wall sections 56, of which only the wall section 56 turned towards a viewer is visible in FIGS. 7 to 16. The inclination of the delivery wall section 56 is such that the second locking element 36, under the action of push by the valve pin 22 and/or the valve-operating rod 26, would rotate in relation to the first locking element 30 about the axis 7 in the sense of the arrow 57 in FIG. 8, were it not for the cams 32 which engage with the catching recesses 35 in the position of blocking of FIG. 7.

The locking mechanism 29 works in the way of a retractable-ballpoint-pen mechanism. This will be explained in the following, based on the instantaneous views of FIGS. 7 to 16 which illustrate the change-over of the locking mechanism 29 between a position of blocking seen in FIGS. 7 and 16 and a position of release seen in FIG. 11. For completion reference is made to FIGS. 2 to 6.

Figure 3:
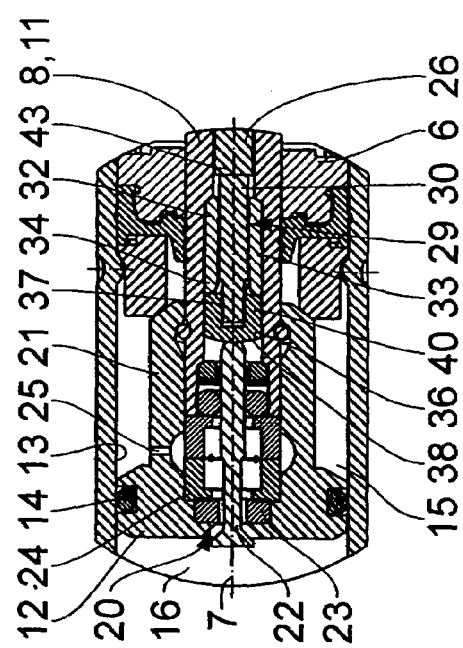
Figure 4:
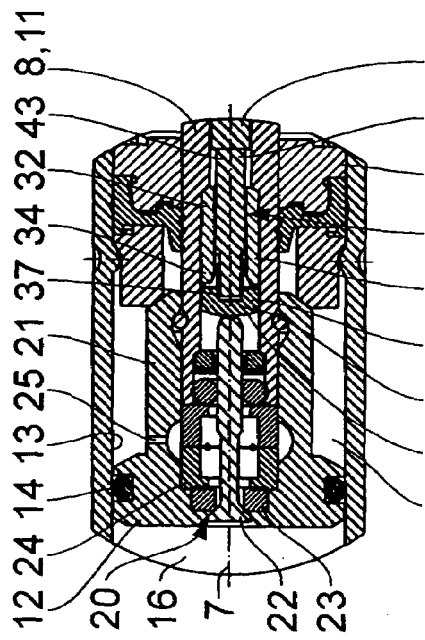
Figure 5:
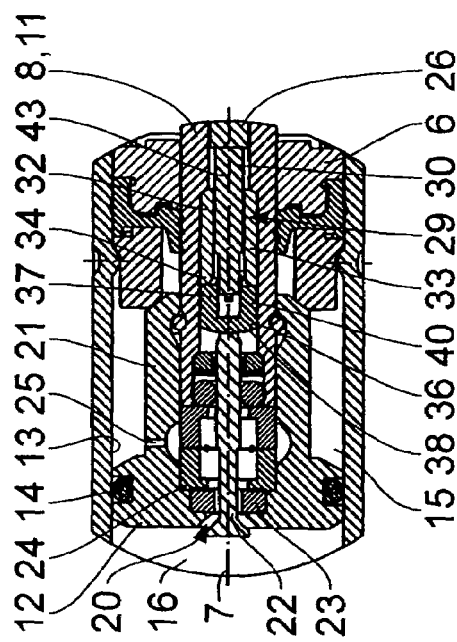

With the valve-operating rod 26 exerting a pushing force 58 of actuation (cf. FIG. 8), the first locking element 30, starting from the position of blocking, is displaced in relation to the snap-in guide sleeve 33 in the direction of the pushing force 58. The first locking element 30 pushes the second locking element 36 in the direction of the pushing force 58 until the catching recesses 35 and the cams 32 disengage. This position is seen in FIG. 8. Then the second locking element 36 moves along the skewed delivery wall sections 56 of the first locking element 36 and, in doing so, rotates about the axis 7 in the direction of the arrow 57 until complementary skewed surfaces of the locking teeth 46, 55 engage with each other as seen in FIG. 9. In this position of engagement of the locking teeth 46, 55, skewed surfaces of the locking teeth 55 of the second locking element 36 overlap the skewed front walls, turned towards the skewed surfaces, of the locking projections 34 of the cams 32 in the circumferential direction about the axis 7. The motion of rotation of the second locking element 36 about the axis 7 into the position of FIGS. 3 and 9 is produced by the pushing force 59, by which the valve pin 22 (not shown) acts on the second locking element 36.

When the valve-operating rod 26 is not actuated any longer, there being no longer any pushing force 58 for actuation, then the first locking element 30, possibly by action of a restoring spring (not shown), returns into a position corresponding to that of FIG. 7 with the control-head halves 44, 45 resting on the sleeve 51. The locking teeth 46, 55 disengage so that the second locking element 36 may continue to rotate in the direction of the arrow 57 under the action of the pushing force 59, generated by pressure, of the valve pin 22, with opposed sloping flanks of the locking teeth 55 sliding on the skewed, opposed frontal ends of the locking projections 34 of the cams 32. The start of this motion of rotation is seen in FIG. 10, the end in FIG. 11.

Figure 10:
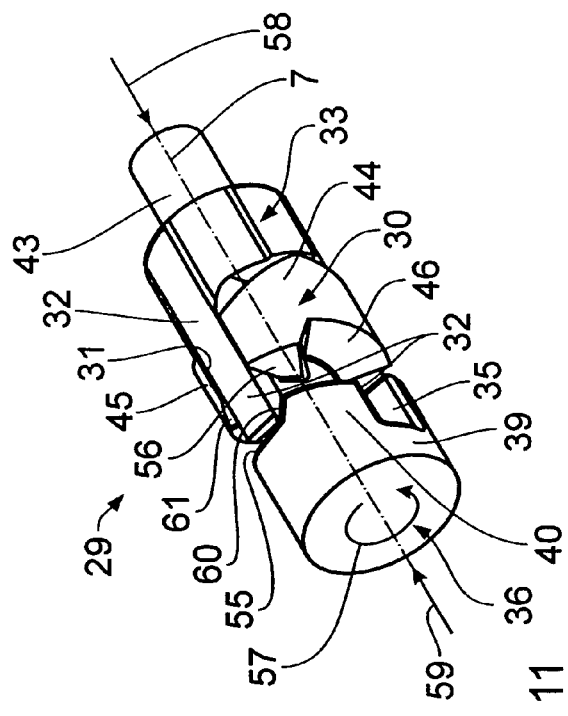
Figure 11:
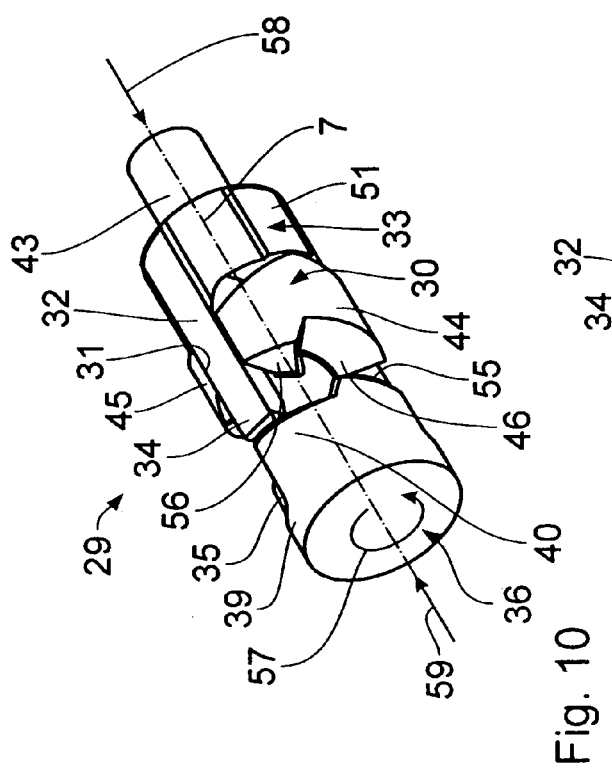

If the locking teeth 46, 55 still rest on each other during this motion of rotation, the complementary skewed surfaces of the locking teeth 46, 55, which slide on each other during this rotation, force the first locking element 30 into the initial position seen for example in FIG. 10. In the instantaneous position of FIGS. 4 and 11, the frontal ends of the locking projections 34 have snap-engaged with corresponding locking projections 60 of the locking teeth 55. As compared to the position of blocking of FIG. 7, the bottom wall turned towards the valve pin 22 is displaced by the release stroke of the valve pin 22. Consequently, FIG. 11 shows the locking mechanism 29 in a position of release. In this position, the valve 20 is open and locked, the pushing force 59 by which the valve pin 22 acts on the second locking element 36 providing for reliable locking engagement.

Figure 12:
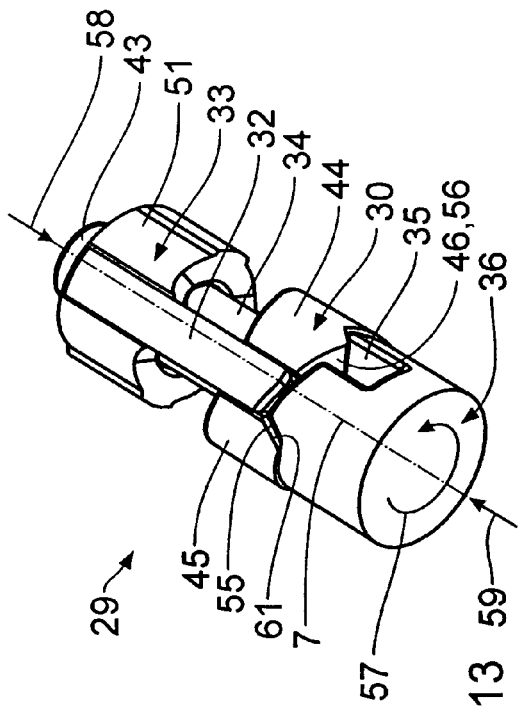
Figure 13:
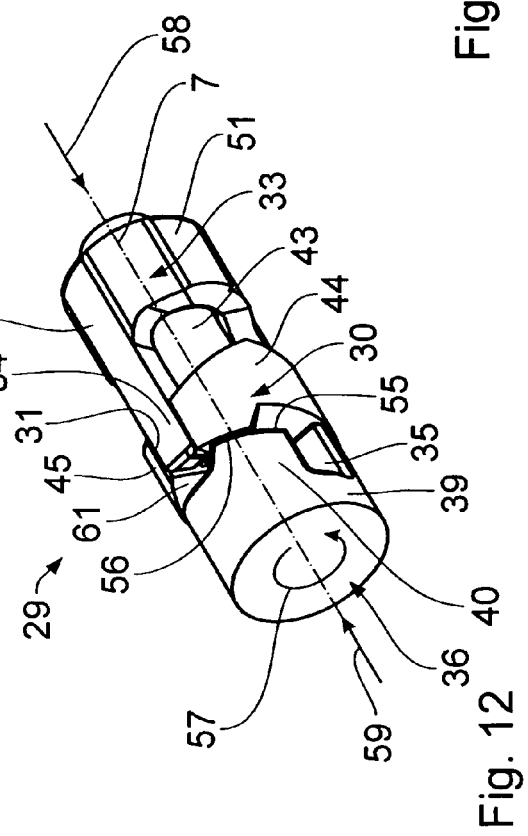

When the valve-operating rod 26, starting from the instantaneous position of FIG. 11, is again actuated by the pushing force 58, then the first locking element 30 pushes the second locking element 36 in a direction towards the valve pin 22 sufficiently long for the locking projections 60 and the locking projections 34 to disengage. This instantaneous position is seen in FIG. 12. Then, under the action of the pushing forces 58, 59, skewed surfaces of the locking teeth 55 move along the delivery wall sections 56 50 that the second locking element 36 is further rotated in relation to the first locking element 30 about the axis 7 in the direction of the arrow 57. This continues until the locking projections 60 bear against complementary intermediate stops 61 of the locking teeth 46, which is seen in FIG. 13 and corresponds to the instantaneous position of FIG. 5. With actuation of the valve-operating rod 26 terminated, the first locking element 30 slides back in the direction towards the sleeve 51 as seen in FIG. 14. This motion of return of the first locking element 30 is supported by the skewed locking projections 60 sliding along the complementary, skewed stops 61 as seen in particular in FIG. 15 which is an illustration of details of FIG. 14. This forcibly guided motion of return of the first locking element 30 prevents the delivery wall section 56 from interfering with the continuing motion of rotation of the second locking element 36. Therefore, the catching recess 35 is able to rotate past the delivery wall section 56. Afterwards, skewed surfaces of the locking teeth 55 again slide along the skewed front walls of the locking projections 34 until the catching recesses 35 have rotated sufficiently far for the guiding projections 34 to engage therewith, whereupon the position of blocking of the locking mechanism 29 has again been accomplished (cf. FIGS. 6 and 16).

Consequently, the delivery wall sections 56 cooperate with the locking teeth 55 of the second locking element 36 for sliding engagement upon displacement from the position of blocking into the position of release as well as upon displacement from the position of release into the position of blocking.

What is claimed is:

1. An adjustable-length compression spring, having
   a casing (1) filled with pressure fluid;
   a guide and seal unit (6) which closes the casing (1) at a first end (5);
   a piston rod (8) which, through the guide and seal unit (6), is extended from, and sealed towards, the first end (5) and has an outer end (9);
   a piston (12) which is joined to the piston rod (8) and sealingly guided in the casing (1);
   a first sectional casing chamber (15) which is unilaterally defined by the piston (12) and filled with pressure fluid;
   a second sectional casing chamber (16) which is connectable to the first sectional casing chamber (15) and filled with pressure fluid;
   an operating valve (20) for connection to each other of the sectional casing chambers (15, 16), the valve (20) comprising a valve pin (22) to be actuated from outside the casing (1) by an operating element (27, 28), the valve pin (22) being displaceable between a position of release and a position of blocking such that
   in the position of release of the valve pin (22), the connection between the sectional casing chambers (15, 16) is released; and
   in the position of blocking of the valve pin (22), the connection between the sectional casing chambers (15, 16) is shut off;
   the adjustable-length compression spring comprising a locking mechanism (29) which is disposed in the casing (1) inside the piston rod (8), having
      a first locking element (30) which is in pushing connection with the operating element (27, 28);
      a second locking element (36) which is in pushing connection with the valve pin (22);
      both of which cooperate through actuation of the first locking element (30) by the operating element (27, 28) shifts of the second locking element (36) between a first engaged position and a second engaged position such that the valve pin (22) in a first engaged position of the second locking elements (36), is in a position of release and in a second engaged position of the second locking elements (36), is in a position of blocking.

2. A compression spring according to claim 1, comprising a snap-in guide element (33), stationary in the casing (1), for guidance of a first of the locking elements (30) in the direction of displacement of the valve pin (22), the locking elements (30, 36) cooperating with the snap-in guide element (33)
   such that change-over between the two locking positions is obtained by rotation, regularly in the same sense of rotation (57), of the second locking element (36), which is not longitudinally guided by the snap-in guide element (33), in relation to the first locking element (30), which is longitudinally guided; and
   such that the locking positions are obtained by locking cooperation of the second locking element (36) with the snap-in guide element (33).

3. A compression spring according to claim 2, wherein the longitudinally guided locking element (30) comprises an intermediate stop (61) for defined motion of rotation of the second locking element (36) such that, prior to the second locking element (36) cooperating with the snap-in guide element (33) for locking engagement, the longitudinally guided locking element (30) disengages from catching recess (35) of the second locking element (36), by way of which the second locking element (36) cooperates with the snap-in guide element (33) for locking engagement.

4. A compression spring according to claim 3, wherein the intermediate stop (61) is inclined such that the motion of rotation of the second locking element (36) supports a motion of displacement of the longitudinally guided locking element (30) for disengagement thereof from the catching recess (35) of the second locking element (36).

5. A compression spring according to claim 2, wherein the longitudinally guided locking element (30) has inclined delivery wall sections (46, 56), along which the second locking element (36) slides upon displacement from the position of release into the position of blocking and from the position of blocking into the position of release, one and the same delivery wall section (56) of the longitudinally guided locking element (30) being used for displacement from the position of release into the position of blocking as well as for displacement from the position of blocking into the position of release.

6. A compression spring according to claim 1, wherein change-over is obtained by rotation of the second locking element (36) by 180°.

7. A compression spring according to claim 1, wherein one of the locking elements (30) is integrally joined to a valve-operating rod (26), by way of which the operating element (27, 28) cooperates with the valve pin (22) via the locking mechanism (29).

* * * * *